US008540004B2

(12) United States Patent
Jeun et al.

(10) Patent No.: US 8,540,004 B2
(45) Date of Patent: Sep. 24, 2013

(54) SHEET WINDER

(76) Inventors: Yong Hwan Jeun, Goyang-si (KR); Jong Soo Bae, Seoul (KR)

( * ) Notice: Subject to any disclaimer, the term of this patent is extended or adjusted under 35 U.S.C. 154(b) by 74 days.

(21) Appl. No.: 13/345,837

(22) Filed: Jan. 9, 2012

(65) Prior Publication Data

US 2012/0285625 A1 Nov. 15, 2012

(30) Foreign Application Priority Data

May 12, 2011 (KR) ........................ 10-2011-0044782

(51) Int. Cl.
*B32B 27/10* (2006.01)

(52) U.S. Cl.
USPC ............ 156/536; 156/281; 156/502; 156/516

(58) Field of Classification Search
USPC .............. 156/324, 379.6, 282, 538, 543, 536, 156/502, 516, 535, 539, 556, 578, 582
See application file for complete search history.

(56) References Cited

U.S. PATENT DOCUMENTS

| | | | | |
|---|---|---|---|---|
| 3,741,854 | A * | 6/1973 | De Goria | 28/95 |
| 4,921,556 | A * | 5/1990 | Hakiel et al. | 156/164 |
| 6,083,580 | A * | 7/2000 | Finestone et al. | 428/34.2 |

* cited by examiner

*Primary Examiner* — Katarzyna Wyrozebski Lee
*Assistant Examiner* — Vishal I Patel
(74) *Attorney, Agent, or Firm* — Sherr & Jiang, PLLC

(57) ABSTRACT

Disclosed is a sheet winder which enables a sheet roll paper wound in a roll shape to be used in manufacturing of a corrugated cardboard for packing cases, in which the sheet roll paper is obtained by laminating sheet papers printed one by one using a lithography technique as one of the most general and economical printing methods and a roll paper used as a material for manufacturing the corrugated cardboard for packing cases.

1 Claim, 2 Drawing Sheets

SHEET WINDER

CROSS-REFERENCE TO RELATED APPLICATION

This application claims the benefit of Korean Patent Application No. 10-2011-0044782, filed May 12, 2011, the disclosure of which is hereby incorporated herein by reference in its entirety.

BACKGROUND OF THE INVENTION

1. Field of the Invention

An aspect of the present invention relates to a sheet winder which enables a sheet roll paper wound in a roll shape to be used in manufacturing of a corrugated cardboard for packing cases, in which the sheet roll paper is obtained by laminating sheet papers printed one by one using a lithography technique as one of the most general and economical printing methods and a roll paper used as a material for manufacturing the corrugated cardboard for packing cases.

2. Description of the Related Art

With the development of technologies and the improvement of income levels, large-sized electronic products such as a flat panel television, a refrigerator and a washing machine are sold in large quantities, and accordingly, the use of large-sized packing boxes for safety delivery of the large-sized electronic products are increased.

A corrugated cardboard which is light, cheap and strong is used as a material of the packing boxes. However, one-color characters or figures are printed on a yellow surface of the corrugated cardboard, which degrades the dignity of high-quality electronic products to be packed.

Therefore, the high quality of packing boxes is pursued by manufacturing packing boxes using a corrugated cardboard and separately attaching a high-quality sheet paper printed with highly designed characters and figures to a surface of each of the packing boxes so as to improve the quality of products to be packed.

However, since a separate attaching process is added to the manufacturing method of packing boxes, productivity is deteriorated and manufacturing cost is considerably increased. Therefore, efficient packing operations are not performed in large quantities.

SUMMARY OF THE INVENTION

Embodiments of the present invention provide a sheet winder which processes a sheet roll paper obtained by laminating a sheet paper printed with highly designed characters and figures and a roll paper as a material of a corrugated cardboard and then winding the sheet roll paper to be used as a material of packing boxes for electronic products, thereby manufacturing the corrugated cardboard for packing boxes suitable for the dignity of high-quality electronic products.

According to an aspect of the present invention, there is provided a sheet winder for winding a sheet as a material of a packing box, wherein sheet papers printed with characters and figures are supplied from a sheet paper supply part to a laminating part; a roll paper supplied from a roll paper supply part is preheated by a first preheating roll and supplied to an adhesive coating part; the roll paper coated with an adhesive by an adhesive coating roll in the adhesive coating part is preheated by a second preheating roller and supplied to the laminating part; the sheet papers and the roll paper are laminated as a sheet roll paper while passing between a laminating roll and an auxiliary laminating roll in the laminating part; the sheet roll paper is dried while passing through an infrared drying part in which infrared light is irradiated by an infrared lamp and a heating roll drying part in which heat is radiated by a heating roll; the sheet roll paper is cooled while passing through a cooling part having a cooling fan, and wound in a winding part; a cleaning roll transfers a cleaning solution of a cleaning solution container to the laminating roll so that the laminating roll is cleaned, and a scraper scrapes the cleaning solution on an outer circumferential surface of the laminating roll; and a scraper cleaning roll transfers the cleaning solution stored in the cleaning solution container to the scraper so that the scraper is cleaned.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

Figure 1:
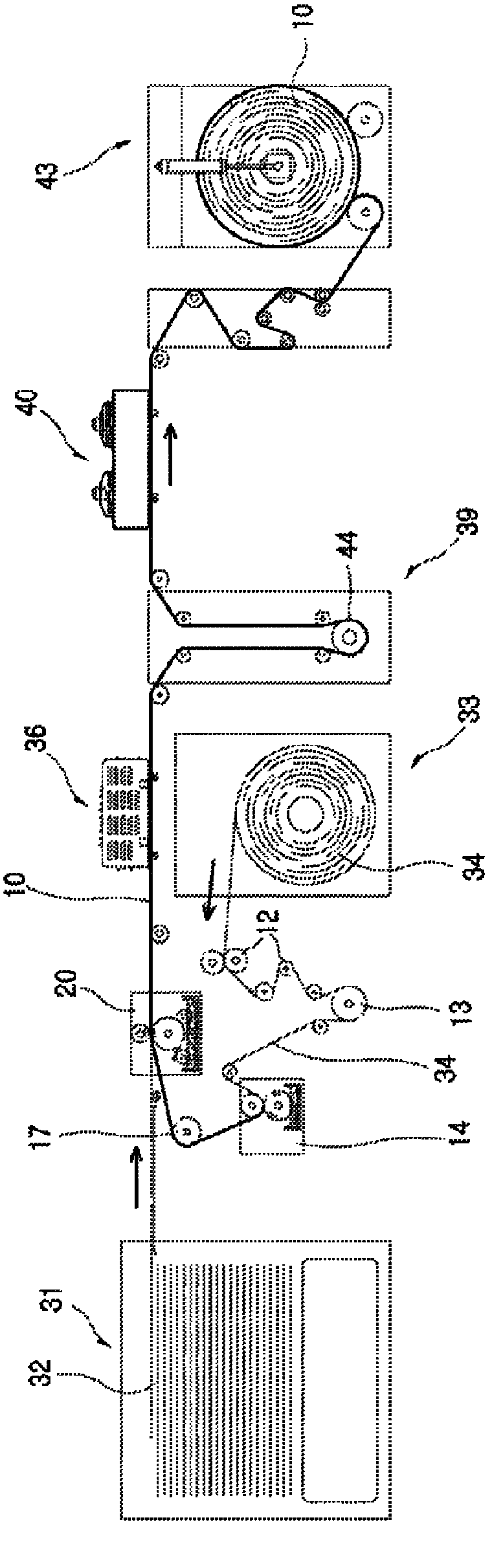
FIG. 1 is a view illustrating a sheet winder for winding a sheet roll paper produced by laminating a sheet paper and a roll paper according to an embodiment of the present invention.
Figure 2:
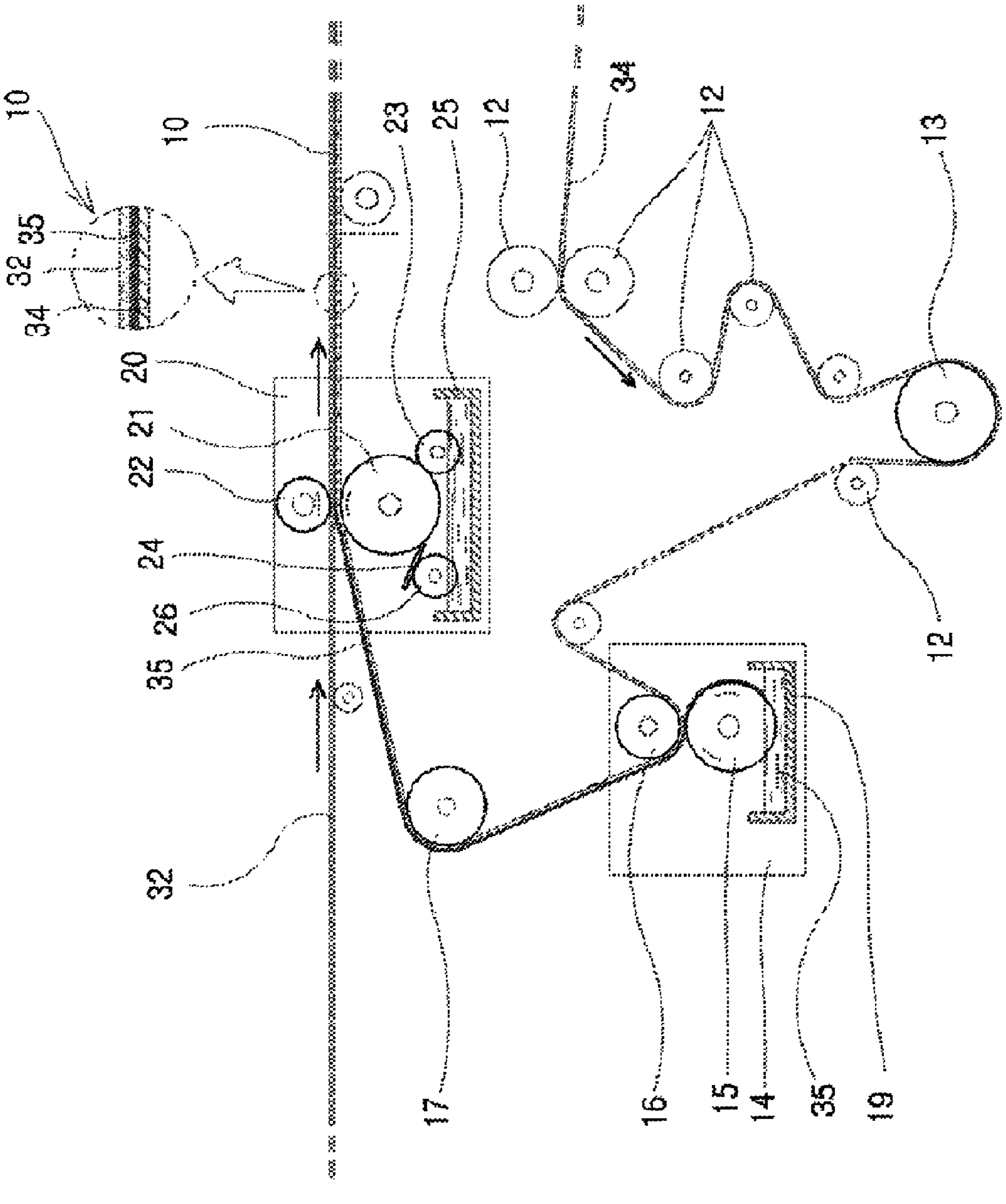
FIG. 2 is a view illustrating an adhesive coating part and a lamination part, constituting the sheet winder according to the embodiment of the present invention.

The configuration of a sheet winder according to an embodiment of the present invention will be described in detail with reference to FIGS. 1 and 2.

The sheet winder according to the embodiment of the present invention is configured to wind a sheet roll paper 10 obtained by laminating high-quality sheet papers 32 each printed with highly designed characters and figures and a roll paper 34 for manufacturing a corrugated cardboard as a material of packing boxes.

The sheet winder is configured to include a sheet paper supply part 31, a roll paper supply part 33, an adhesive coating part 14, a laminating part 20, an infrared drying part 36 and a heating roll drying part 39, a cooling part 40 and a winding part 43, which are sequentially disposed. The sheet paper supply part 31 sequentially supplies the laminated sheet papers 32. The roll paper supply part 33 continuously supplies the roll paper 34. The adhesive coating part 14 coats an adhesive 35 on the roll paper 34. The laminating part 20 laminates, as the sheet roll paper 10, the roll paper 34 coated with the adhesive 35 and the supplied sheet papers 32. The infrared drying part 36 and the heating roll drying part 39 dry the adhesive 35 between the sheet papers 32 and the roll paper 34. The cooling part 40 cools the sheet roll paper 10 of which temperature is increased in the drying process. The winding part 43 winds the cooled sheet roll paper 10 to be used as the corrugated cardboard for packing boxes.

The main components of the sheet winder are a first preheating roll 13, the adhesive coating part 14, a second preheating roll 17 and the infrared drying part 36. The first preheating roller 13 preheats the roll paper 34 continuously supplied from the roll paper supply part 33 under the guidance of a guide roll 12, and the adhesive 35 coating part 14 thinly coats the adhesive on the roll paper 34 preheated by the first preheating roll 13. Then, the second preheating roll 17 preheats the roll paper 34 coated with the adhesive 35 once again, and the sheet roll paper 10 obtained by laminating the roll paper 34 transferred while being coated with the adhesive 35 and the sheet papers 32 supplied from the sheet paper supply part 31 is transferred to the infrared drying part 36.

The laminating process will be described in detail. The first preheating roll 13 primarily preheats the roll paper 34 when the roll paper 34 is transferred while coming in contact with the first preheating roll 13. The preheating helps the adhesive 35 coated on the roll paper 34 not to be formed as a lump but to be uniformly coated.

The adhesive coating part 14 is configured to include an adhesive coating roll 15 and an auxiliary adhesive coating roll 16. The adhesive coating roll 15 transfers the adhesive 35 stored in an adhesive container 19 to the roll paper 34 so that the adhesive 35 is thinly coated on the roll paper 34 when the roll paper 34 is transferred. The auxiliary adhesive coating roll 16 transfers the roll paper 34 while rotating in engagement with the adhesive coating roll 15.

The second preheating roll 17 preheats the roll paper 34 coated with the adhesive 35 once again. Thus, the adhesion of the adhesive 35 coated on the roll paper 34 is increased by the preheating.

The laminating part 20 is configured so that the sheet papers 32 supplied from the sheet paper supply part 31 and the roll paper 34 transferred while being coated with the adhesive 35 by the adhesive coating part 14 are laminated as the sheet roll paper 10 by being contacted and pressed together while passing between a laminating roll 21 and an auxiliary laminating roll 22.

In this case, a cleaning roll 23 cleans the adhesive 35 stuck to the laminating roll 21 in the laminating process by transferring a cleaning solution stored in a cleaning solution container 25 while rotating in engagement with the laminating roll 21, and a scraper 24 comes in contact with an outer circumferential surface of the laminating roll 21 so as to scrape the cleaning solution transferred to the laminating roll 21.

A scraper cleaning roll 26 allows the adhesive 35 stuck to the scraper 24 to be cleaned with the cleaning solution by transferring the cleaning solution stored in the cleaning solution container 25 to the scraper 24 while rotating in contact with the scraper 24.

The operating method of the sheet winder according to the embodiment of the present invention configured as described above will be described as follows.

The high-quality sheet papers 32 printed with highly designed characters and figures are stacked in the sheet paper supply part 31, and the staked sheet papers 32 are sequentially transferred to the laminating part 20.

The roll paper 34 for manufacturing a corrugated cardboard, which is wound in the roll paper supply part 33, is preheated by heat of the first preheating roller 13 while being transferred to the first preheating roller 13 under the guidance of the guide roll 12, and then transferred to the adhesive coating part 14.

The primarily preheated roll paper 34 is thinly coated with the adhesive 35 stored in the adhesive container 19, which is transferred to the adhesive coating roll 15 while passing between the adhesive coating roll 15 and the auxiliary adhesive coating roll 16 in the adhesive coating part 14, and then secondarily preheated while passing through the second preheating roll 17. The secondarily preheated roll paper 34 is transferred to the laminating part 20.

The roll paper 34 preheated and transferred while being coated with the adhesive 35 and the sheet papers 32 supplied from the sheet paper supply part 31 are adhered to each other by the adhesive 35 by being pressed and laminated together while passing between the laminating roll 21 and the auxiliary laminating roll 22 in the laminating part 20, so that the laminated paper is processed as the sheet roll paper 10. Then, the sheet roll paper 10 is transferred to the infrared drying part 36.

In this case, a part of the adhesive 35 may be leaked and stuck to the laminating roll 21 when the roll paper 34 and the sheet papers 32, passing between the laminating roll 21 and the auxiliary laminating roll 22, are adhered to each other by the adhesive 35.

The cleaning solution stored in the cleaning solution container 25 is transferred to the laminating roll 21 by the cleaning roll rotating in the engagement with the laminating roll 21 so as to clean the adhesive 35 stuck to the laminating roll 21, and the cleaning solution transferred to the laminating roll 21 is scraped by the scraper 24.

Simultaneously, the adhesive 35 stuck to the scraper 24 is cleaned with the cleaning solution by the scraper cleaning roll 26 transferring the cleaning solution stored in the cleaning solution container 25 while rotating in contact with the scraper 24.

The adhesive 35 is completely dried when the sheet roll paper 10 obtained by laminating the sheet papers 32 and the roll paper 34 using the laminating part 20 passes through the infrared drying part 36 in which infrared light is irradiated by an infrared lamp and the heating roll drying part 39 in which heat is radiated by a heating roll 44. Then, the heated sheet roll paper 10 is again cooled while passing through the cooling part 40 having a cooling fan, and then wound in the winding part 43.

The sheet roll paper 10 wound as described above is used as a material of the corrugated cardboard for manufacturing packing boxes for electronic products.

According to the present invention, a sheet rolling paper obtained by laminating a roll paper for manufacturing a corrugated cardboard, which is used as a material of packing boxes, and high-quality sheet papers printed with highly designed characters and figures are wound to be used in manufacturing of the corrugated cardboard of packing boxes for electronic products, and the corrugated cardboard for packing boxes of electronic products is processed using the wound sheet roll paper, thereby manufacturing the packing boxes for electronic products. Accordingly, it is possible to improve the dignity of high-quality electronic products.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A sheet winder for winding a sheet as a material of a packing box, wherein:

sheet papers printed with characters and figures are supplied from a sheet paper supply part to a laminating part;

a roll paper supplied from a roll paper supply part is preheated by a first preheating roll and supplied to an adhesive coating part;

the roll paper coated with an adhesive by an adhesive coating roll in the adhesive coating part is preheated by a second preheating roller and supplied to the laminating part;

the sheet papers and the roll paper are laminated as a sheet roll paper while passing between a laminating roll and an auxiliary laminating roll in the laminating part;

the sheet roll paper is dried while passing through an infrared drying part in which infrared light is irradiated by an infrared lamp and a heating roll drying part in which heat is radiated by a heating roll;

the sheet roll paper is cooled while passing through a cooling part having a cooling fan, and wound in a winding part;

a cleaning roll transfers a cleaning solution of a cleaning solution container to the laminating roll so that the laminating roll is cleaned, and a scraper scrapes the cleaning solution on an outer circumferential surface of the laminating roll; and a scraper cleaning roll transfers the cleaning solution stored in the cleaning solution container to the scraper so that the scraper is cleaned.

* * * * *